(12) United States Patent
Polmans et al.

(10) Patent No.: US 10,589,775 B2
(45) Date of Patent: Mar. 17, 2020

(54) FEEDBACK ACTUATOR FOR A STEERING MECHANISM

(71) Applicants: THYSSENKRUPP PRESTA AG, Eschen (LI); thyssenkrupp AG, Essen (DE)

(72) Inventors: Kristof Polmans, Tarrenz (AT); Thomas Kettenberger, Trostberg (DE)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 45 days.

(21) Appl. No.: 15/773,828

(22) PCT Filed: Nov. 17, 2016

(86) PCT No.: PCT/EP2016/077975
§ 371 (c)(1),
(2) Date: May 4, 2018

(87) PCT Pub. No.: WO2017/089217
PCT Pub. Date: Jun. 1, 2017

(65) Prior Publication Data
US 2018/0319422 A1    Nov. 8, 2018

(30) Foreign Application Priority Data
Nov. 25, 2015  (DE) .................. 10 2015 015 148

(51) Int. Cl.
*B62D 5/00* (2006.01)
*B62D 6/00* (2006.01)

(52) U.S. Cl.
CPC ............. *B62D 5/006* (2013.01); *B62D 5/005* (2013.01); *B62D 6/008* (2013.01)

(58) Field of Classification Search
CPC ......... B62D 5/005; B62D 5/006; B62D 6/008
See application file for complete search history.

(56) References Cited

U.S. PATENT DOCUMENTS 6,820,713 B2 * 11/2004 Menjak .................. B62D 5/006
                                                180/402
6,899,196 B2 *  5/2005 Husain ................... B62D 5/005
                                                180/402

(Continued)

FOREIGN PATENT DOCUMENTS

CN       101298255 A    11/2008
CN       101596915 A    12/2009

(Continued)

OTHER PUBLICATIONS

English Translation of International Search Report issued in PCT/EP2016/077975, dated Mar. 9, 2017 (dated Mar. 20, 2017).

*Primary Examiner* — Kevin Hurley
(74) *Attorney, Agent, or Firm* — thyssenkrupp North America, Inc.

(57) ABSTRACT

A feedback actuator for a steering mechanism for motor vehicles may include a steering adjuster that acts on the steered wheels and is controlled electronically based on steering commands of a drive of the motor vehicle. The feedback actuator may transmit feedback from a road to a steering wheel via a steering shaft. Further, the feedback actuator may have a preloaded belt drive and an electric motor configured as torque-generating means. The feedback actuator may generate a torque to simulate the feedback of the road. The torque may be formed by a sum of a torque from the preloaded belt drive applied to the steering shaft and a torque from the electric motor applied to the steering shaft.

18 Claims, 3 Drawing Sheets

(56) References Cited

U.S. PATENT DOCUMENTS

| | | | |
|---|---|---|---|
| 6,926,112 B2* | 8/2005 | Husain | B62D 5/005 |
| | | | 180/402 |
| 7,293,626 B2* | 11/2007 | Ozsoylu | B62D 5/0421 |
| | | | 180/444 |
| 8,162,095 B2* | 4/2012 | Bootz | B60R 25/021 |
| | | | 180/403 |
| 8,862,325 B2* | 10/2014 | Soos | B62D 5/0424 |
| | | | 180/444 |
| 10,046,792 B2* | 8/2018 | Soti | B62D 5/0484 |
| 2007/0235240 A1* | 10/2007 | Lauer | B62D 5/008 |
| | | | 180/204 |
| 2011/0184608 A1 | 7/2011 | Benyo | |
| 2011/0224876 A1 | 9/2011 | Paholics | |
| 2012/0041645 A1 | 2/2012 | Benyo | |
| 2013/0030653 A1 | 1/2013 | Soos | |
| 2016/0318443 A1* | 11/2016 | Lickfold | B60Q 9/00 |
| 2018/0118254 A1* | 5/2018 | Toko | B62D 5/0463 |
| 2018/0127022 A1* | 5/2018 | Bakos | B62D 5/046 |
| 2018/0186406 A1* | 7/2018 | Itou | B62D 1/286 |
| 2019/0118853 A1* | 4/2019 | Delmarco | B62D 5/006 |

FOREIGN PATENT DOCUMENTS

| | | |
|---|---|---|
| CN | 103587576 A | 2/2014 |
| CN | 203876812 U | 10/2014 |
| DE | 19539101 C | 2/1997 |
| DE | 19908832 A | 9/2000 |
| DE | 10159330 A | 7/2002 |
| DE | 10248343 A | 8/2003 |
| WO | 2016071270 A | 5/2016 |

\* cited by examiner

FEEDBACK ACTUATOR FOR A STEERING MECHANISM

CROSS REFERENCE TO RELATED APPLICATIONS

This application is a U.S. National Stage Entry of International Patent Application Ser. No. PCT/EP2016/077975, filed Nov. 17, 2016, which claims priority to German Patent Application No. DE 10 2015 015 148.7, filed Nov. 25, 2015, the entire contents of both of which are incorporated herein by reference.

FIELD

The present disclosure generally relates to steering mechanisms, including feedback actuators for a steering systems.

BACKGROUND

In the case of a steer-by-wire steering system, the position of the steered wheels is not directly coupled with the steering wheel. There is a connection between the steering wheel and the steered wheels via electrical signals. The driver's steering command is picked up by a steering angle sensor and, depending on the driver's steering command, the position of the steered wheels is regulated via a steering adjuster. A mechanical connection to the wheels is not provided, so that after actuation of the steering wheel, force feedback is missing, for example relevant feedback when parking, where a small force is desired for comfort reasons, or during a usual drive, where a higher steering torque corresponding to the vehicle response is desired. To simulate the feedback from the road on the steering wheel in the case of steer-by-wire steering, it is necessary to provide a feedback actuator on the steering wheel and the steering column, which characterizes a steering feel according to the feedback effects of the steering operation. This feedback actuator usually consists of an electric motor, which acts via a reduction gear on the steering column. In the case of this steering wheel actuator, it is disadvantageous that its production is associated with high costs and there is a substantial space requirement in the area of the steering column.

DE 195 39 101 C1 discloses a feedback simulation where a self-aligning torque is exerted on the steering wheel and the steering shaft. Thereby, a return spring arrangement is provided, which exerts a self-aligning torque on the steering wheel. The desired course of the self-aligning torque as a function of the steering angle is generated by an electric motor. A disadvantage of this solution is that the motor must be designed with large-scale dimensions accordingly due to the required high level of self-aligning torque.

Thus a need exists for an improved feedback actuator for a steering mechanism for motor vehicles.

DETAILED DESCRIPTION

Figure 1:
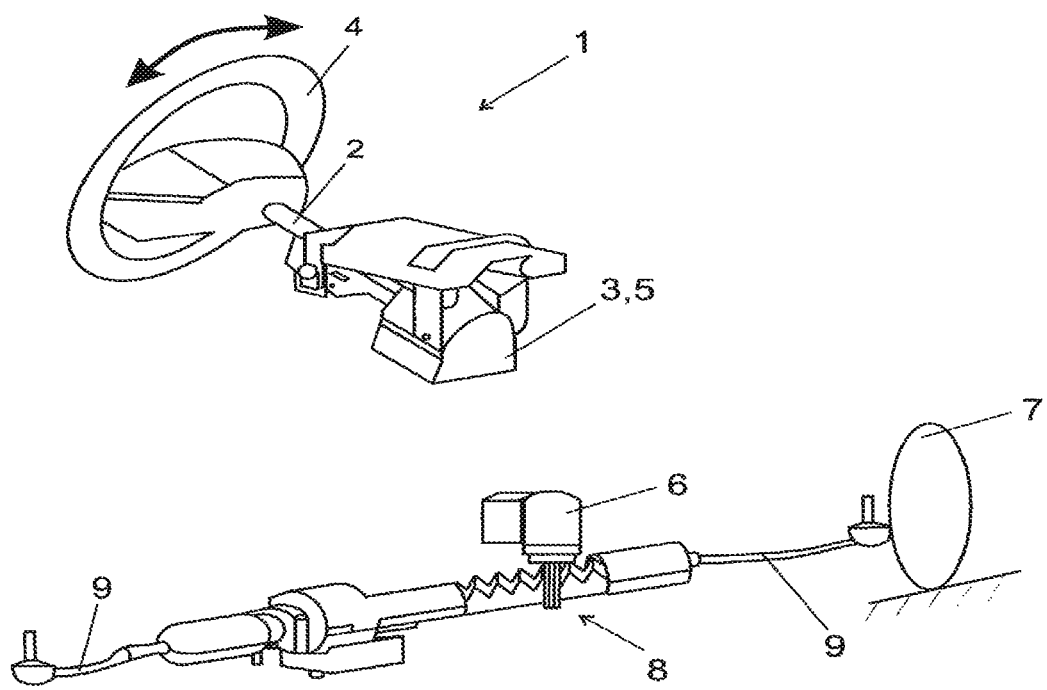
FIG. 1 is a schematic view of an example steer-by-wire motor vehicle steering mechanism.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a feedback actuator for a steering mechanism for motor vehicles may include a steering adjuster that acts on the steered wheels and is controlled electronically in accordance with the driver's steering command. The feedback actuator may transmit feedback from the road to a steering wheel via a steering shaft, and the feedback actuator may comprise a preloaded belt drive and an electric motor. Due to the preloaded belt drive, the electric motor can be more compact. This saves installation space, weight, and costs. In some cases, the preloaded belt drive is only arranged on one side with reference to the steering shaft. This saves additional installation space. In some examples, the belt drive has a spring-loaded cable pull.

It is advantageous if the feedback actuator according to the invention is used in a steer-by-wire steering system. More preferably, a feedback actuator is desired in the case of conventional steering systems, such as electromechanical power steering. Preferably, the torque formed by the feedback actuator is formed to simulate the feedback from the road as the sum of a torque from the preloaded belt drive applied to the steering shaft and a torque from the electric motor applied to the steering shaft.

In a preferred embodiment, the spring-loaded cable pull comprises a cable drum connected to the steering shaft in a torque-proof manner and a swivel-mounted cam disk spaced away from the steering shaft, wherein the cam disk is connected to a return spring and preloaded into a zero position. Due to the selection of the geometric shape of the cable drum and the cam disk, the manual torque curve can be easily predefined. In an embodiment, the cable drum is shaped like a heart in the cross section. The cam disk has a preferably kidney-shaped profile.

Preferably, the cable pull has a cable, which is connected to the cable drum and the cam disk. In the case of the heart-shaped variant of the cable drum, the cable is connected to the cable drum in the cut-out. Preferably, the return spring is a spiral spring. The cam disk advantageously has a driver connected to the return spring. Thereby, a guide contour is preferably provided on the cam disk so that the cable is specifically guided.

In a zero position, the cable is taut and rolled out to a maximum level from the cable drum. This has the advantage that the torque introduced onto the steering shaft by the cable pull is the same in both steering directions.

When rotating the steering shaft, a degressively increasing counter-torque generated by the spring-loaded cable pull can be adjusted by the electric motor acting on the steering shaft. Thereby, it is advantageous if the adjustment takes place depending on the speed of the motor vehicle.

Preferably, the feedback actuator generates a torque to simulate the feedback from the road that is formed by the sum of a torque from the preloaded belt drive applied to the steering shaft and a torque from the electric motor applied to the steering shaft. Thereby, it is advantageous if, when rotating the steering shaft, a degressively increasing counter-torque generated by the preloaded belt drive can be adjusted by the electric motor acting on the steering shaft depending on the speed of the motor vehicle and the steering speed.

In an advantageous embodiment, the preloaded belt drive comprises a cable pull, wherein the spring-loaded cable pull has a cable drum connected to the steering shaft in a torque-proof manner and a swivel-mounted cam disk spaced away from the steering shaft, wherein the cam disk is connected to a return spring and preloaded into a zero position. The cable pull comprises a cable, which is preferably connected to the cable drum and the cam disk and can be rolled up and rolled out in a guided manner in a guide contour. In the zero position, the cable is taut and preferably rolled out from the cable drum to a maximum level.

In an advantageous embodiment of the invention, a steer-by-wire steering system for a feedback actuator is provided, which transmits the feedback from the road to a steering wheel via a steering shaft and has a preloaded belt drive and an electric motor as a torque-generating means.

In FIG. 1, a steer-by-wire steering mechanism 1 is shown. A rotation-angle sensor (not shown) is attached to a steering shaft 2, which detects the angle of rotation applied by rotating the steering wheel 4. Furthermore, a feedback actuator 5 is attached to the steering shaft 2, which is used to transmit the feedback from the road to the steering wheel 4 and thereby, to give the driver feedback on the steering and driving behavior of the vehicle. The driver's steering command is transmitted to a control unit via signal lines via the angle of rotation of the steering shaft 2 measured by the rotation-angle sensor. The control unit controls an electric steering adjuster 6, which controls the position of the steered wheels 7 depending on the signal from the rotation-angle sensor, as well as other parameters, such as vehicle speed, yaw rate, steering speed and the like. The steering adjuster 6 indirectly acts on the steered wheels 7 via a steering gear 8 as well as a tie rod 9 and other components.

Figure 2:
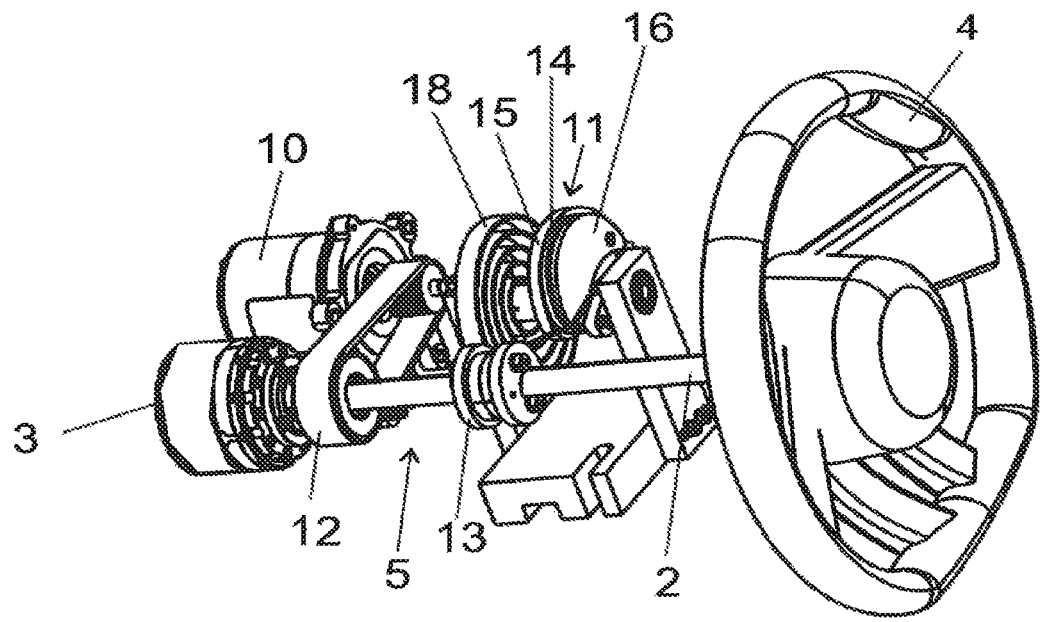
FIG. 2 is a perspective view of an example steering wheel with a steering shaft, a friction element, and a feedback actuator.

FIG. 2 shows a feedback actuator 5 according to the invention with an electric motor 10 and a cable pull 11. The steering wheel 4 is connected to the steering shaft 2 in a torque-proof manner. There is an adjustable friction and actuation element 3 arranged at the end of the steering shaft 2, which superimposes the applied manual torque depending on the vehicle and steering speed and steering direction in order to give the driver the most natural steering feel possible. The electric motor 10 is connected to the steering shaft 2 via a belt drive 12. The cable pull 11 comprises a cable drum 13, which is connected to the steering shaft 2 in a torque-proof manner, a cable 14, a cam disk 16 arranged on a plate 15 and a driver 17, which is connected to the end of a spiral spring 18. The cam disk 16 is used is a cable guide element. For this purpose, it at least partially comprises a guide contour for a cable 14 on its outer circumferential surface.

Figure 3:
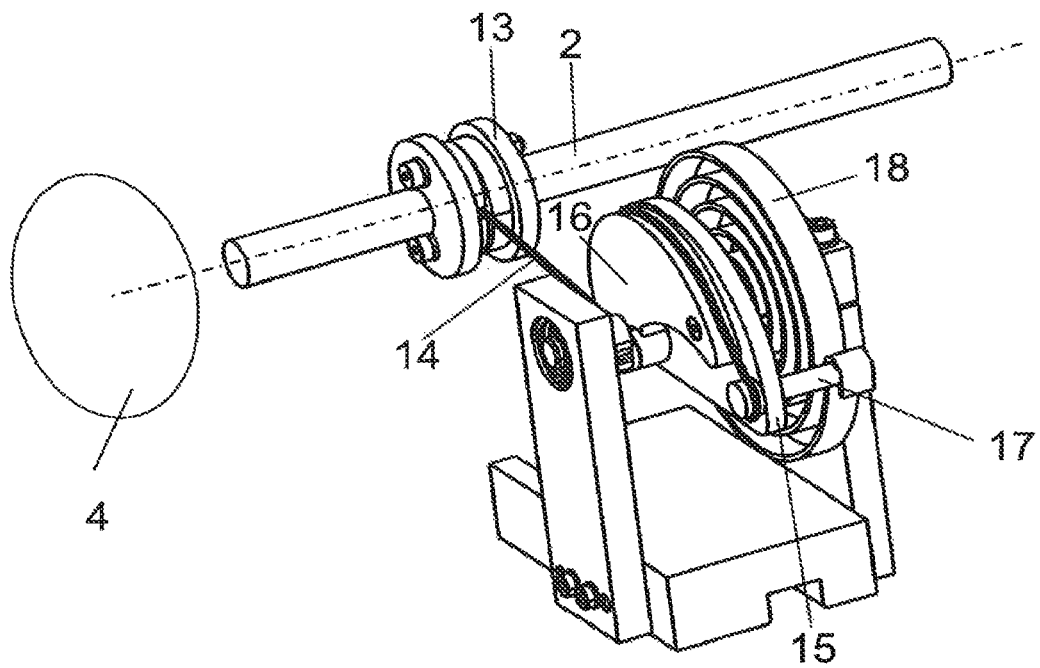
FIG. 3 is a perspective view of an example cable pull of a feedback actuator.
Figure 4:
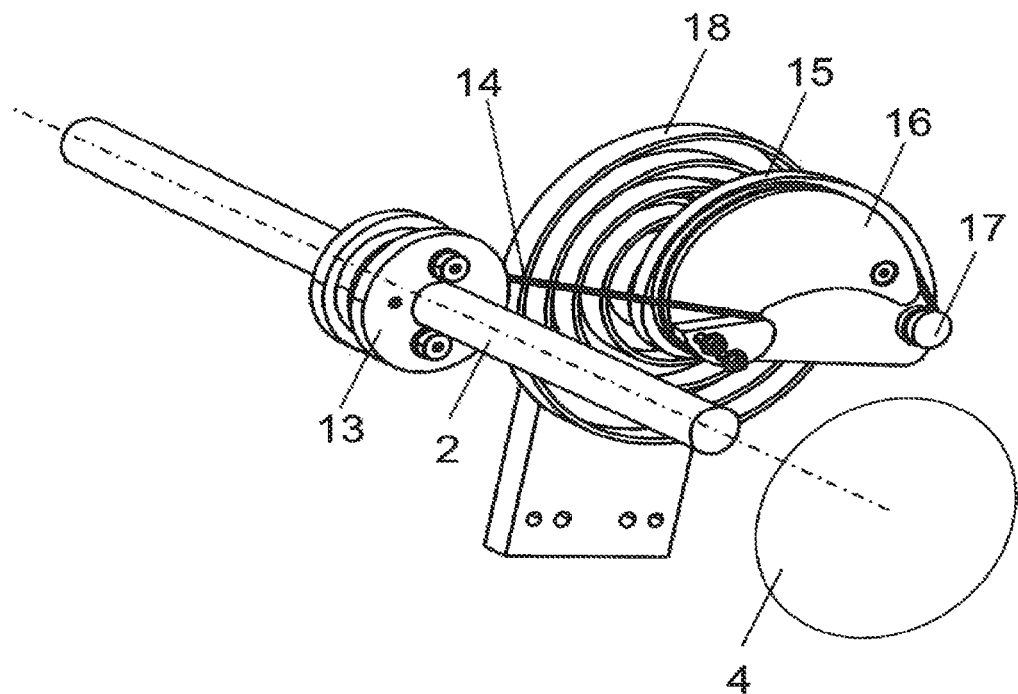
FIG. 4 is another perspective view of the example cable pull from FIG. 3.
Figure 5:
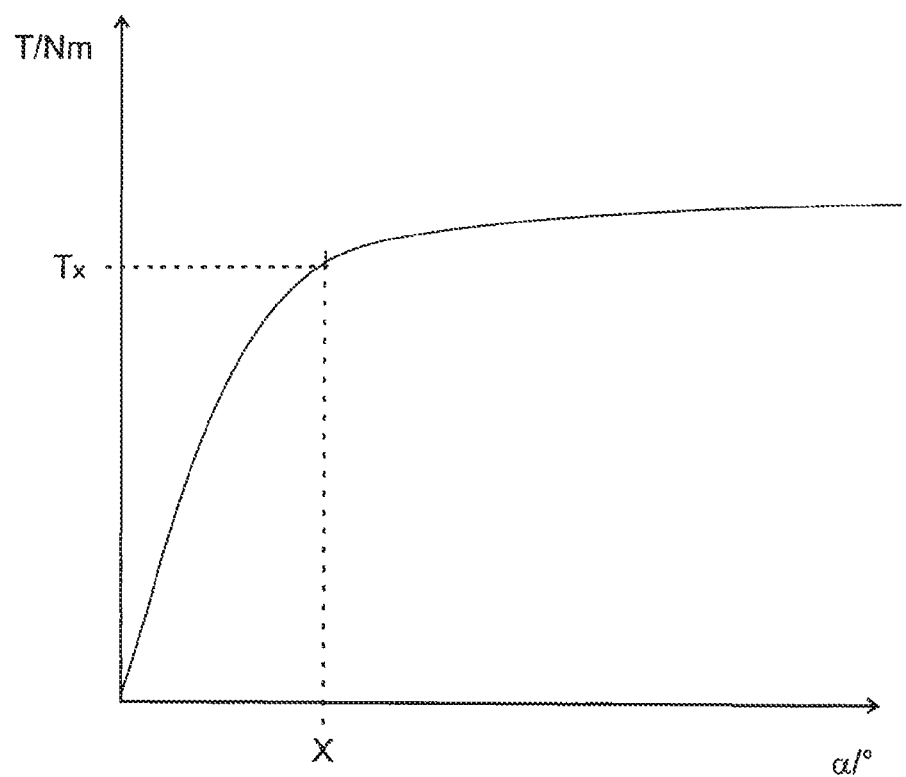
FIG. 5 is a graph of a steering torque curve of an example cable pull.

In FIGS. 3 and 4, the cable pull 11 is shown in detail. FIG. 3 shows the straight position of the steering mechanism, the so-called zero position. The cable 14 is attached to the cable drum 13 as well as to the driver 17. The rotational axis of the cable drum 13 coincides with the rotational axis of the steering shaft 2. The plate 15 is connected to the cam disk 16 in a torque-proof manner and swivel-mounted at a predetermined distance to the steering shaft 2. The rotational axis is aligned in parallel to the rotational axis of the steering shaft 2. The driver 17 is permanently connected both to the plate 15 as well as the spiral spring 18. Thereby, the cable 14 is always tightened by the steering shaft 2 via the outer circumferential surface of the cam disk 16 to the driver 17. In order to transmit an ever increasing resistance or steering torque to the driver up to a certain steering angle (e.g. 120°), an angle of rotation introduced by the driver via the steering wheel 4 is passed on to the steering shaft 2 and then it is passed on to the driver 17 via the cable 14. In a zero position of the steering mechanism, the cable 14 is taut and rolled out of the cable drum 13 to a maximum level. When deflected, the cable 14 is wound up in a clockwise direction or in a counter-clockwise direction by the cable drum 13 on the steering shaft 2 depending on the steering direction and unwound by the cam disk 16. Thereby, the spiral spring 18, which grips into the driver 17, tightens and generates a degressively increasing counter-force, which is transmitted via the cable 14, thereby generating a torque. The counter-force of the spiral spring 18 increases linearly with the enlarging amount of the steering angle and equals a degressive manual torque curve or steering torque curve due to the variable points of attachment on the driver 17 and the cable drum 13. The degressive curve profile of T over α is shown in FIG. 5. The curve initially steeply increases up to a steering wheel angle X up to the manual torque Tx and then reaches an approximate saturation. The torque results from the geometric shape of the cable drum 13 and the cam disk 16 and of the lever arm resulting therefrom. The generated counter-force depends on the amount of the steering angle and is therefore the same for both steering directions.

Due to the electric motor 10, which is coupled with the steering shaft 2 by means of the belt drive 12, the generated torque can be increased or decreased.

In addition, the system has a friction or damping element, which superimposes the manual torque depending on the vehicle and steering-angle speed, as well as the steering direction. As a result, as natural a steering feel as possible should be achieved.

The function of the feedback actuator described up until this point is to generate a manual torque curve for the driving and parking operations of a vehicle. During rotary movements on the steering wheel, the cable of the cable pull is wound onto the cable drum connected to the steering wheel and unwound by the cable guide of the cam disk. By means of this, the spiral spring is taut and the cable transmits a force, which represents the desired degressive manual toque on the steering wheel due to the geometric shape of the cable drum and the cam disk connected to the steering wheel or the steering shaft. The speed-dependent adjustment of the manual torque curve is carried out by the electric motor, which grips into the steering axle with appropriate transmission. By means of the mechanical components, the electric motor can be designed to be clearly smaller, which saves costs and weight. The base friction in the system and the manual torque curve for parking operations is represented via an adjustable friction element in the steering train.

What is claimed is:

1. A feedback actuator for a steering mechanism for a motor vehicle, the feedback actuator comprising:

a steering adjuster that acts on steered wheels and is controlled electronically based on steering commands of a driver of the motor vehicle;

a steering shaft via which feedback from a road is transmitted to a steering wheel; and a preloaded belt drive and an electric motor configured as torque-generating means, wherein the preloaded belt drive comprises a spring-loaded cable pull.

2. The feedback actuator of claim 1 wherein the feedback actuator generates a torque to simulate the feedback of the road, the torque being formed by a sum of a torque from the preloaded belt drive applied to the steering shaft and a torque from the electric motor applied to the steering shaft.

3. The feedback actuator of claim 1 wherein the spring-loaded cable pull comprises a cable drum connected to the steering shaft in a torque-proof manner and a swivel-mounted cam disc spaced apart from the steering shaft, wherein the swivel-mounted cam disc is connected to a return spring and preloaded into a zero position.

4. The feedback actuator of claim 3 wherein the return spring is a spiral spring.

5. The feedback actuator of claim 3 wherein the swivel-mounted cam disc comprises a driver connected to the return spring.

6. The feedback actuator of claim 3 wherein the spring-loaded cable pull comprises a cable that is connected to the cable drum and the swivel-mounted cam disc.

7. The feedback actuator of claim 6 wherein the cable is configured to be rolled out and up on the swivel-mounted cam disc guided within a guide contour.

8. The feedback actuator of claim 6 wherein the cable is taught in a zero position and rolled out from the cable drum to a maximum extent.

9. The feedback actuator of claim 1 wherein when rotating the steering shaft a degressively increasing counter-torque generated by the spring-loaded cable pull is adjustable by the electric motor acting on the steering shaft.

10. The feedback actuator of claim 9 wherein adjustment of the spring-loaded cable pull depends on a speed of the motor vehicle.

11. A steer-by-wire steering mechanism for a motor vehicle comprising:

a steering adjuster that acts on steered wheels and is controlled electronically based on steering commands of a driver of the motor vehicle; and a feedback actuator that transmits feedback from a road to a steering wheel via a steering shaft, wherein the feedback actuator includes a preloaded belt drive and an electric motor configured as torque-generating means, wherein the preloaded belt drive comprises a spring-loaded cable pull.

12. The steer-by-wire steering mechanism of claim 11 wherein the feedback actuator generates a torque to simulate the feedback of the road, the torque being formed by a sum of a torque from the preloaded belt drive applied to the steering shaft and a torque from the electric motor applied to the steering shaft.

13. The steer-by-wire steering mechanism of claim 11 wherein the spring-loaded cable pull comprises a cable drum connected to the steering shaft in a torque-proof manner and a swivel-mounted cam disc spaced apart from the steering shaft, wherein the swivel-mounted cam disc is connected to a return spring and preloaded into a zero position.

14. The steer-by-wire steering mechanism of claim 13 wherein the return spring is a spiral spring.

15. The steer-by-wire steering mechanism of claim 13 wherein the swivel-mounted cam disc comprises a driver connected to the return spring.

16. The steer-by-wire steering mechanism of claim 13 wherein the spring-loaded cable pull comprises a cable that is connected to the cable drum and the swivel-mounted cam disc.

17. The steer-by-wire steering mechanism of claim 16 wherein the cable is configured to be rolled out and up on the swivel-mounted cam disc guided within a guide contour.

18. The steer-by-wire steering mechanism of claim 11 wherein when rotating the steering shaft a degressively increasing counter-torque generated by the spring-loaded cable pull is adjustable by the electric motor acting on the steering shaft.

* * * * *